United States Patent Office 3,577,413
Patented May 4, 1971

3,577,413
PROCESS OF PREPARING TRITYLAMINES
Charles R. Adams, Oakland, Calif., and Hans J. Arpe, am Quintengarten, Hans J. Schulze-Steinen, Bad Soden, Taunus, and Jurgen F. Falbe, Wasserland, Germany, Alan C. Edwards, The Hague, Netherlands, and Hans Tetteroo, Wasserland, Germany, assignors to Shell Oil Company, New York, N.Y.
No Drawing. Filed Oct. 11, 1967, Ser. No. 674,637
Claims priority, application Germany, Oct. 14, 1966, P 16 20 412.9
Int. Cl. C07d 87/26
U.S. Cl. 260—247          8 Claims

ABSTRACT OF THE DISCLOSURE

Process of preparing tritylamines by reacting a primary or secondary amine with a trityl chloride-Friedel-Crafts catalyst complex, e.g., N-tritylmorpholine is prepared by reacting morpholine with a trityl chloride-aluminum trichloride complex.

BACKGROUND OF THE INVENTION

This invention relates to an improved process of preparing tritylamines, i.e., triphenylmethylamines.

One known method of preparing tritylamines involves reacting trityl chloride with a primary or secondary amine in the presence of a hydrogen chloride acceptor. Such a process is disclosed in U.S. Pat. 3,225,039. While this is a convenient method, especially for laboratory-scale synthesis, it is not an economically attractive process for large-scale operations because of the expense involved in synthesizing trityl chloride. The usual and most economically attractive process for synthesizing trityl chloride is via the well-known Friedel-Crafts reaction of carbon tetrachloride with benzene in the presence of a Friedel-Crafts catalyst such as aluminum chloride. The trityl chloride, which is in the form of a trityl chloride-aluminum chloride complex is isolated by hydrolysis of the complex. This not only involves another step, but also results in poor yields, due to hydrolysis of trityl chloride to triphenyl carbinol. These losses obviously increase the cost of the tritylamines.

British Pat. 872,561 discloses a method of preparing dyestuffs of the triphenylamino-triphenylchloromethane type by reacting a tri-(p-halophenyl)-chloromethane-aluminum chloride complex salt with a substituted aniline at a temperature of 120–200° C. The patent does not disclose or suggest a method of preparing trityl amines.

SUMMARY OF THE INVENTION

Surprisingly, we have found that the trityl chloride-Friedel-Crafts catalyst complex formed during the Friedel-Crafts synthesis of trityl chloride can be reacted with a primary or secondary amine to prepare a trityl amine. Accordingly, this invention is a process for preparing tritylamines of the formula (Ph)₃—C—X     (I)

wherein Ph is phenyl and X is the residue of a primary or secondary amine, by reacting a primary or secondary amine with a trityl chloride-Friedel-Crafts catalyst complex.

The invention process then, eliminates the necessity of using trityl chloride as a starting material, thus avoiding the prior art difficulties involved in preparing this easily hydrolyzable compound.

The reaction described in British Pat. 872,561, although superficially similar, is directed to a different process involving different reaction conditions.

The trityl amines prepared by the process of this invention are biologically active compounds, being especially useful as molluscicides as described in U.S. 3,225,039.

DESCRIPTION OF THE PREFERRED EMBODIMENTS

The term "residue of a primary or secondary amine" as used herein means any primary or secondary amine in which a hydrogen attached to the nitrogen has been removed. The residue represented by X, then, can also be represented by —NHR or —NRR' in which R and R' are each, independently, alkyl, cycloalkyl, alkenyl, aryl, alkaryl or aralkyl. R can also represent a radical of the formula —CH₂—Y where Y is a heterocyclic radical. Additionally, R and R' together can represent the divalent moiety completing the heterocyclic ring with the indicated nitrogen atom.

For reasons of ease of synthesis, the alkyl, alkenyl, aryl, alkaryl or aralkyl radicals represented by R and R' suitably contain up to 12 carbon atoms while the cycloalkyl radicals will desirably contain 5–6 carbon atoms.

When R represents the heterocyclic radical, —CH₂—Y, it is preferably one containing no more than 10 carbon atoms, and containing 5 to 6 atoms in the ring. The ring may be saturated or unsaturated, there may be more than one hetero atom in the ring; preferably the hetero atom or atoms is (are) oxygen, nitrogen, or sulfur. Desirably the hetero ring is composed of one atom of nitrogen, oxygen or sulfur and from 4 to 5 atoms of carbon, with attachment to the methylene group being at a carbon atom of the hetero ring. Examples of suitable hetero radicals are furyl, pyranyl, thienyl and pyridyl and their partially or completed hydrogenated derivatives.

When R and R' together represent a radical completing with the nitrogen atom a heterocyclic ring, this nitrogen may be the sole hetero atom or there may be an additional nitrogen or oxygen atom in the ring. The ring is preferably 5 or 6-membered and may be saturated or unsaturated. Particularly high molluscicidal activity is exhibited by compounds in which this heterocyclic radical is pyrrolidyl, tetrahydropyridyl, piperidyl, morpholino or 1,2-oxazolidinyl.

In view of possible steric hindrance factors when both R and R' are bulky groups, it is preferred that when the residue is represented by —NRR', that R' is alkyl of 1–4 carbon atoms; R being as previously defined.

The primary or secondary amines used in this process may be represented by the formula NH₂R and NHRR' in which R and R' are as previously described. The amines may also be substituted with from one to a plurality of substituents such as carboxy, hydroxy, alkoxy, nitro, sulfonyl, cyano or halogen.

Exemplary of these amines are methylamine, diethylamine, methylethylamine, n-hexylamine, n-dodecylamine, cyclohexylamine, 4-amino-1-butene, 2-propenylamine, 2-propenylmethylamine, aniline, β-naphthylamine, ethylaniline, diphenylamine, o-toluidine, 2,4-xylidine, β-phenylethylamine, benzylamine, morpholine, N-methyl-2-furfurylamine, isoxazolidine, piperidine, imidazole, pyrrole, pyrazole and the like.

The Friedel-Crafts catalysts which complex with trityl chloride to form trityl chloride-Friedel-Crafts catalyst complexes are well known substances. By Friedel-Crafts catalysts are meant those covalent metal halides which have the ability to catalyze Friedel-Crafts alkylation or acylation processes. These include the metal halides wherein the halogen has an atomic number of from 9 to 35, i.e., the halogen is fluorine, chlorine or bromine. Illustrative of these covalent metal halides are BF₃, AlCl₃, AlBr₃, FeCl₃, SnCl₄, ZnCl₂, and the like with AlCl₃ being preferred.

The trityl chloride-Friedel-Crafts catalyst complex may be prepared by any of the known processes described in the literature. These processes generally involve the condensation of an aromatic hydrocarbon with a halogenated alkane in the presence of a Friedel-Crafts catalyst. One convenient method involves the condensation of benzene and carbon tetrachloride with aluminum trichloride as described in J. Amer. Chem. Soc. 37, 2577 (1915).

The trityl chloride Friedel-Crafts catalyst complex may also be expressed as a salt [triphenylmethyl]$^+$ [MA$_n$Cl]$^-$ in which M is the covalent metal ion such as aluminum, boron, tin, iron, zinc, etc., A is the halide ion of atomic number 9 to 35, i.e., fluorine, chlorine or bromine, and $n$ is the valence of the metal ion. The preferred complex is the trityl chloride-aluminum trichloride complex, which may be expressed as the salt by [triphenylmethyl]$^+$ [AlCl$_4$]$^-$.

These tritryl chloride-Friedel-Crafts catalyst complexes contain a 1:1 molar ratio of trityl chloride and Friedel-Crafts catalyst. When the complexes are prepared by the preferred method, e.g., with benzene, carbon tetrachloride and aluminum chloride, they may be reacted directly with the primary or secondary amine without isolation. The HCl formed during the Friedel-Crafts reaction should, however, be removed before reacting the primary or secondary amine with the complex. This solution may also contain a slight excess of aluminum chloride, although this is generally not desirable, since this excess complexes with the amine, increasing the amount of amine needed to form the tritylamine.

While the reaction between the primary or secondary amine and the trityl chloride-Friedel-Crafts catalyst complex to form the tritylamine is a 1:1 molar reaction, i.e., one mole of each starting material, the by-products of the reaction, HCl and AlCl$_3$, for example, each form a 1:1 molar complex with the amine, e.g., in the case of morpholine the by-products are

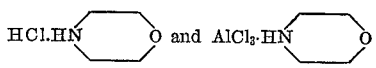

Stoichiometrically, then 3 moles of the amine are consumed to 1 mole of the complex. Lower ratios then the 3/1 stoichiometric ratio may be used, but separation of the trityl amine from the reaction mixture becomes more difficult at the lower ratios.

It is not necessary, however, to use this 3/1 ratio of primary or secondary amine to complex since a tertiary amine may be used to bind the HCl and AlCl$_3$. For example, 1 mole of the primary or secondary amine and 2 moles of a tertiary amine may be used to 1 mole of the complex. The molar ratio of tertiary amine to primary or secondary amine can vary widely; a suitable range being about 1/5 to 5/1. The total molar ratio of amines, primary, secondary and tertiary, to complex should generally not exceed about 6/1 as yields of tritylamine decrease at the higher amine/complex ratios.

Any tertiary amine may be used to replace part of the primary or secondary amine. Preferably the tertiary amine is one of limited solubility in water, since it can be recovered more easily from its salts after completion of the reaction. Suitable tertiary amines, NRR$^1$R$^2$, are those wherein R, R$^1$ and R$^2$ have the meanings described previously for R and R$^1$ in the primary and secondary amines. Preferred however, are the trialkylamines, the dialkylanilines, and especially the alkyl-substituted pyridines; each alkyl radical within this preferred grouping containing preferably 1-8 carbon atoms and the number of alkyl radicals on the pyridine being anywhere from 1-5. These preferred amines include triethylamine, N,N-dimethylaniline, 2-picoline, 2-ethyl-3,5-dimethylpyridine, mixtures of alkyl pyridines and the like.

The process of the invention may conveniently be carried out by gradually adding the primary or secondary amine and tertiary amine, if used, preferably as a solution in an inert solvent, to a solution of the complex in an inert solvent. The temperature of the reaction should be maintained between about 0° C. to 100° C., desirably between 30° C. and 70° C. and preferably between about 30° C.–60° C. External cooling or heating may be applied as required.

Any solvent which is inert under the conditions of the reaction may be used. Suitable inert solvents include the aliphatic hydrocarbons such as hexane, heptane, cyclohexane and the like; the aromatic hydrocarbons such as benzene, toluene, the xylenes and the like; and the chlorinated aliphatic and aromatic hydrocarbons such as chloroform, tetrachloroethylene, trichloroethylene, dichloromethane, carbon tetrachloride, chlorobenzene, the dichlorobenzenes, the chlorotoluenes and the like. Carbon tetrachloride is the preferred solvent.

After the completion of the reaction the tritylamine, which is usually dissolved in the solvent, may be separated by any of the conventional techniques for isolating dissolved compounds such as evaporation of the solvent. That portion of the amine that complexes with the HCl and Friedel-Crafts catalyst may be recovered by treatment with concentrated alkali. This treatment neutralizes the amine salt and liberates the amine.

In the practice of the preferred embodiment, morpholine is reacted with the trityl chloride-aluminum trichloride complex in the presence of a water insoluble tertiary amine such as the alkyl-substituted pyridines. By using these water insoluble tertiary amines instead of excess morpholine to complex the HCl and AlCl$_3$, the recovery of these amines is greatly facilitated. Thus, the water insoluble tertiary amines liberated from their HCl and AlCl$_3$ complexes by the aqueous caustic solution, can readily be separated from this mixture of water and solvent. The morpholine, on the other hand, is soluble in the water, thus creating a further separation problem.

The following examples illustrate the inventive process of preparing tritylamines.

EXAMPLE 1

Preparation of trityl chloride-aluminum chloride complex 179 grams (1.16 moles) of dry carbon tetrachloride was added with stirring over two hours at a temperature of from 60°–65° C. to a mixture of 133.5 grams (97%, 0.97 mole) of anhydrous AlCl$_3$ and 560 grams (7.78 moles) of thiophene free, dry benzene. After all the carbon tetrachloride had been added stirring was continued for an hour at a tempertaure of 60° C. Subsequently, dry nitrogen was passed through until no more HCl ecaped. This method was used to prepare all the trityl chloride-aluminum chloride complex used in the following examples.

EXAMPLE 2

Preparation of N-tritylmorpholine

A solution of 130.7 g. (1.5 moles) of morpholine in 500 ml. of CCl$_4$ was mixed dropwise, over a period of 30 minutes with stirring at a temperature of 30° with external cooling, with the trityl chloride-AlCl$_3$ complex solution (prepared from 0.485 mole of AlCl$_3$). The reaction mixture was subsequently stirred for 45 minutes at 30° C.

Transferred to a separating funnel, the reaction mixture separated into two phases, the lower phase containing the trityl derivative dissolved in CCl$_4$, the upper phase containing morpholine hydrochloride and a morpholine-AlCl$_3$ complex. After separation of the lower phase the upper phase was extracted twice, each time with 250 ml. of CCl$_4$, and the CCl$_4$-extracts were combined with the bulk of the trityl derivative. The CCl$_4$-solution was contacted with 150 cc. of dilute hydrochloric acid and subsequently washed with water to remove unconverted morpholine. After the solution had been dried over CaCl$_2$ the solvent was evaporated off and the resultant crystalline product was stirred for an hour at room temperature with three times the weight of methanol. After the methanol had been removed by suction and the residue had been dried, 146 g. of N-triphenylmethyl morpholine (98%) was obtained (92.3% of theory, based on a yield of complex of 97%).

Melting point: 175° C.

Analysis.—Calcd. for $C_{23}H_{23}NO$ (percent by weight): C, 83.84; H, 7.04; N, 4.25. Found (percent by weight): C, 83.60; H, 6.90; N, 4.10.

The resultant mixture of morpholine hydrochloride and morpholine-$AlCl_3$ complex was suspended in 500 cc. of $CCl_4$. After the addition of 15 g. of water, 100 g. (2.5 moles) of a NaOH were added with vigorous stirring at a temperature of 50° C. On completion of the reaction, the reaction mixture was dried by stirring it vigorously for an hour with 140 g. of calcium oxide and the morpholine-containing $CCl_4$-solution was purified by removing the solid products by suction over a suction filter, the residue being washed twice, each time with 150 cc. of $CCl_4$. The titration against 0.1 N hydrochloric acid resulted in a morpholine content of 0.87 mole.

A further quantity of 82 g. of N-tritylmorpholine was obtained by converting this morpholine with the complex solution prepared from 0.29 mole of $AlCl_3$ and working up the product as described.

Yield: 85.9% of theory.

converted with vigorous stirring at 30° C. with the introduction of ammonia—instead of NaOH—the morpholine content of the solution after completion of the reaction, drying with 140 g. of CaO, removal by suction of the morpholine-containing solution and removal of the excess ammonia by means of an air stream, was 0.76 mole. 65 grams of N-tritylmorpholine was obtained by converting this morpholine with the complex solution prepared from 0.26 mole of $AlCl_3$ and further working up the product as described.

Yield 76% of theory.

EXAMPLES 3–16

A solution of [b] mol of morpholine and [d] mol of a tertiary amine [c] in [f] cc. of solvent [e] was mixed dropwise over 30 minutes with stirring at a temperature of [t]° C. (if desired with external cooling) with the complex solution prepared from 0.5 mol of $AlCl_3$, having a trityl chloride-$AlCl_3$ content of [a] mole and subsequently stirred for 45 minutes at the reaction temperature [t]. The mixture was further worked up as described in Example 2. The liberated hydrogen chloride and the $AlCl_3$ were bound as hydrochloride or $AlCl_3$ complex of the tertiary base and could be separated off in the same manner as the corresponding morpholine compounds of Example 2. The yields obtained are summarized in Table I.

TABLE 1

| Example | Mol [a] | Mol [b] | [c] | Mol [d] | [e] | Cc. [f] | °C. [t] | Yield, g. | Reaction product purity, percent | Yield, percent of theory |
|---|---|---|---|---|---|---|---|---|---|---|
| 3 | 0.465 | 0.5 | 2-ethyl-3,5-dimethylpyridine | 1.0 | $CCl_4$ | 500 | 30 | 147 | 96 | 92.4 |
| 4 | 0.465 | 0.5 | do | 1.0 | $CCl_4$ | 500 | 60 | 143 | 97 | 90.8 |
| 5 | 0.465 | 0.45 | do | 0.9 | $CCl_4$ | 500 | 60 | 143 | 95 | 91.8 |
| 6 | 0.454 | 0.45 | do | 0.9 | $CCl_4$ | 500 | 20 | 133 | 98 | 88.3 |
| 7 | 0.454 | 0.5 | Commercial grade alkyl pyridine mixture | 1.0 | $CCl_4$ | 500 | 30 | 140 | 97 | 90.7 |
| 8 | 0.454 | 0.5 | do | 1.0 | $CCl_4$ | 500 | 60 | 139 | 96 | 39.0 |
| 9 | 0.460 | 0.5 | N,N-dimethylaniline | 1.0 | $CCl_4$ | 500 | 30 | 141 | 97 | 90.5 |
| 10 | 0.460 | 0.5 | Triethylamine | 1.0 | $CCl_4$ | 500 | 30 | 90 | 91 | 54.3 |
| 11 | 0.460 | 0.5 | 2-picoline | 1.0 | $CCl_4$ | 500 | 30 | 143 | 92 | 86.9 |
| 12 | 0.469 | 0.5 | Commercial grade alkyl pyridine mixture | 1.0 | $CHCl=CCl_2$ | 1,000 | 30 | 141 | 94 | 85.7 |
| 13 | 0.469 | 0.5 | do | 1.0 | $CCl_2=CCl_2$ | 1,000 | 30 | 140 | 97 | 88.1 |
| 14 | 0.469 | 0.5 | 2-ethyl-3,5-dimethylpyridine | 1.0 | $C_6H_6$ | 1,000 | 30 | 149 | 93 | 89.8 |
| 15 | 0.461 | 0.5 | do | 2.0 | $CCl_4$ | 500 | 30 | 130 | 70.3 | 47.6 |
| 16 | 0.461 | 0.5 | 2-picoline | 2.0 | $CCl_4$ | 500 | 30 | 74 | 50 | 24.4 |

When the resultant mixture of morpholine hydrochloride and morpholine-$AlCl_3$ complex was suspended in 500 ml. of $CCl_4$ and, after the addition of 15 g. of water,

EXAMPLES 17–22

Using the procedure of Example 2, the following tritylamines were prepared.

TABLE 2

| | Amine | Reaction product | Yield, percent theory | Melting point, °C. |
|---|---|---|---|---|
| Example: | | | | |
| 17 | Allyl amine | $PH_3C-NH-CH_2CH=CH_2$ [a] | 56.0 | 81 |
| 18 | Aniline | $PH_3C-NH-$  [b] | 57.1 | [h] 153 |
| 19 | Cyclohexylamine | $PH_3C-NH-$  [c] | 59.6 | 124 |
| 20 | Piperidine | $PH_3C-N$  [d] | 68.8 | 150 |
| 21 | Diethylamine | $PH_3C-N(C_2H_5)_2$ [e] | 25.8 | 96 |
| 22 | n-Decylamine | $PH_3C-NH-(CH_2)_9-CH_3$ [f] | 45.0 | [g] |

NOTE.—See the following table.

| Analysis, percent by weight | Calculated | | | Found | | |
|---|---|---|---|---|---|---|
| | C | H | N | C | H | N |
| [a] $C_{22}H_{21}N$ | 88.25 | 7.07 | 4.68 | 88.20 | 7.20 | |
| [b] $C_{25}H_{21}N$ | 89.51 | 6.31 | 4.18 | 89.70 | 6.60 | 4.10 |
| [c] $C_{25}H_{27}N$ | 87.93 | 7.97 | 4.10 | 87.90 | 8.20 | 4.00 |
| [d] $C_{24}H_{25}N$ | 88.03 | 7.70 | 4.27 | 87.30 | 7.90 | |
| [e] $C_{23}H_{25}N$ | 87.57 | 7.99 | 4.44 | 87.20 | 8.30 | |
| [f] $C_{29}H_{37}N$ | 87.2 | 9.30 | 3.5 | 87.10 | 10.70 | 2.8 |

[g] Product could not be obtained in the crystalline form.
[h] According to Chem. Ber. 55, 3218 (1922), melting point 148–149° C.

We claim as our invention:

1. A process for preparing tritylamines which comprises reacting (a), an amine of the formula $NH_2R$ or $NHRR'$ wherein R is alkyl of 1–12 carbon atoms, alkenyl of 3–4 carbon atoms, phenyl, orthomethyl phenyl, 2,4 dimethyl phenyl, naphthyl, β-phenethyl, cycloalkyl of 5–6 carbon atoms, 2-furfuryl or benzyl; R' is alkyl of 1–4 carbon atoms or phenyl; R and R' together with the nitrogen atom form morpholino, pyrrolino, pyrolidino, isoxazolidino, piperidino, tetrahydro pyridino, imidazolino or pyrazolino, with (b), a trityl chloride Friedel-Crafts catalyst complex of the formula $(triphenylmethyl)^+ (MA_nCl)^-$ in which M is a covalent ion of a metal selected from the group consisting of aluminum, boron, tin, iron and zinc; A is a halide ion of atomic number 9 to 35; n is the valence of the metal ion; in liquid phase in an inert solvent at a temperature of 0° C. to 100° C. to form tritylamines of the formula $(Ph)_3$—C—NHR or $(Ph)_3$—C—NRR' wherein Ph is phenyl and R and R' are as defined above.

2. The process of claim wherein the molar ratio of (a)/(b) is not greater than 6/1.

3. The process of claim 2 wherein (b) is a trityl chloride aluminum trichloride complex.

4. The process of claim 3 wherein a tertiary amine is present during the reaction; the molar ratio of tertiary amine plus (a) to (b) being not greater than 6/1.

5. The process of claim 1 wherein said amine is morpholine.

6. The process of claim 5 wherein said inert solvent is carbon tetrachloride and the temperature range is from 0°–70° C.

7. The process of claim 6 wherein a pyridine substituted with 1–5 alkyl radicals of up to 8 carbon atoms each is present during the reaction; the molar ratio of said alkyl-substituted pyridine/morpholine being from 1/5 to 5/1 and the molar ratio of alkyl-substituted pyridine plus morpholine to (b) being not greater than 6/1.

8. The process of claim 7 wherein the molar ratio of said alkyl-substituted pyridine/morpholine is 2/1 and the molar ratio of alkyl-substituted pyridine plus morpholine/(b) is 3/1.

No references cited.

ALEX MAZEL, Primary Examiner

J. TOVAR, Assistant Examiner

U.S. Cl. X.R.

260—290, 293, 307, 309, 310, 313.1, 326.87; 424—248